No. 664,292.  
W. RIDDELL.  
MOTOR VEHICLE.  
(Application filed Apr. 12, 1900.)  
(No Model.)  
Patented Dec. 18, 1900.  
2 Sheets—Sheet 1.

Witnesses.  
Inventor.  
William Riddell  
by Spear & Seely  
Attorneys

No. 664,292. Patented Dec. 18, 1900.
W. RIDDELL.
MOTOR VEHICLE.
(Application filed Apr. 12, 1900.)
(No Model.) 2 Sheets—Sheet 2.
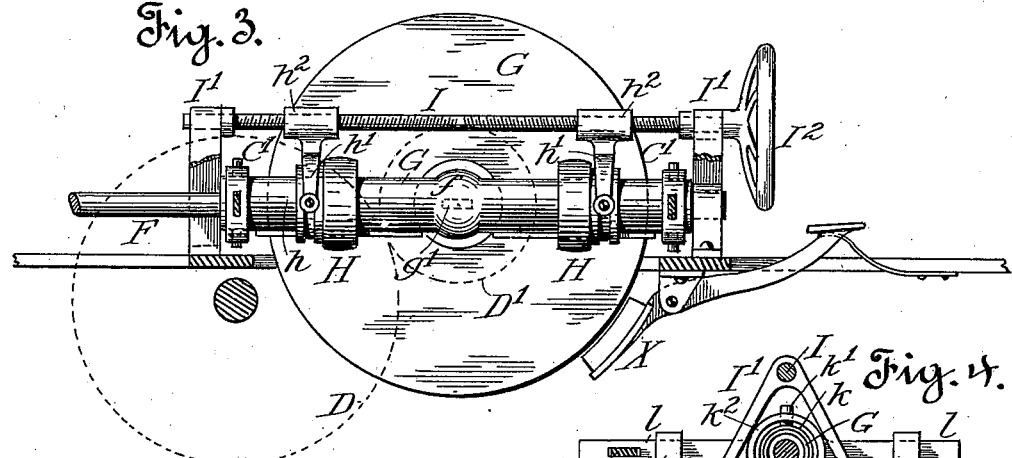
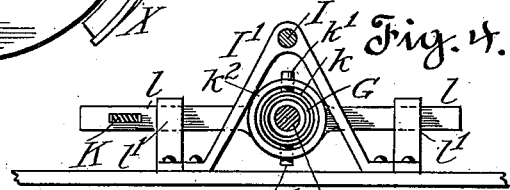
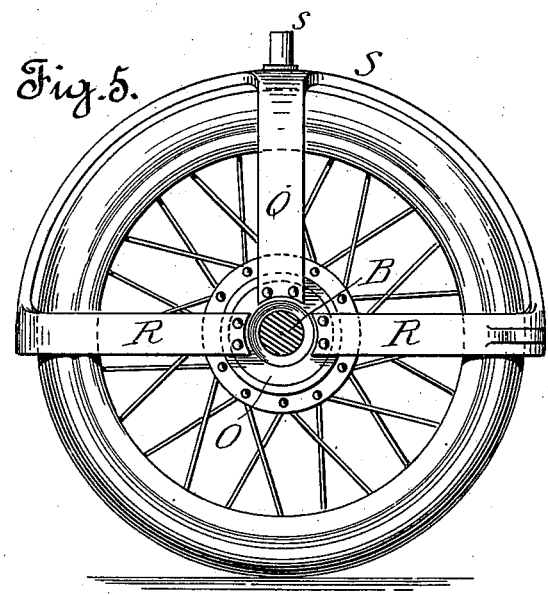
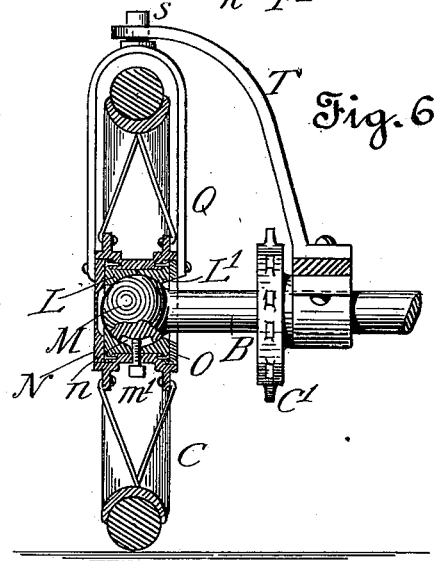
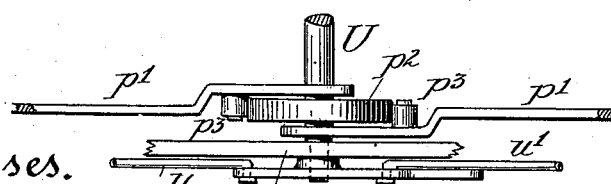
Witnesses. Inventor.
H. Monteverde William Riddell
F. M. Burt by Spear & Seely
Attorneys

UNITED STATES PATENT OFFICE.

WILLIAM RIDDELL, OF SAN FRANCISCO, CALIFORNIA.

MOTOR-VEHICLE.

SPECIFICATION forming part of Letters Patent No. 664,292, dated December 18, 1900.

Application filed April 12, 1900. Serial No. 12,608. (No model.)

*To all whom it may concern:*

Be it known that I, WILLIAM RIDDELL, a citizen of the United States, residing at San Francisco, in the county of San Francisco and State of California, have invented certain new and useful Improvements in Motor-Vehicles, of which the following is a specification.

My invention relates to motor-vehicles, and more particularly to the driving and steering of such vehicles.

The invention comprises improvements in the manner of mounting the carrying-wheels, so that they are capable of swiveling independently; further, in connecting all the swiveling carrying-wheels for simultaneous steering from a single steering-rod; further, in mounting each wheel upon an independent axle, so as to obtain a differential speed on turns and curves; further, in an improved construction of frictional driving-gear for the wheels on both sides provided with variable-speed mechanism; further, in means for controlling the frictional pressure, so as to wholly or entirely relieve it upon one side, which is the inner radius upon any curve or turn, and which means are automatic and operated by the steering.

It comprises also improvements in details of construction which are fully hereinafter described and are shown in the accompanying drawings.

Figure 1:
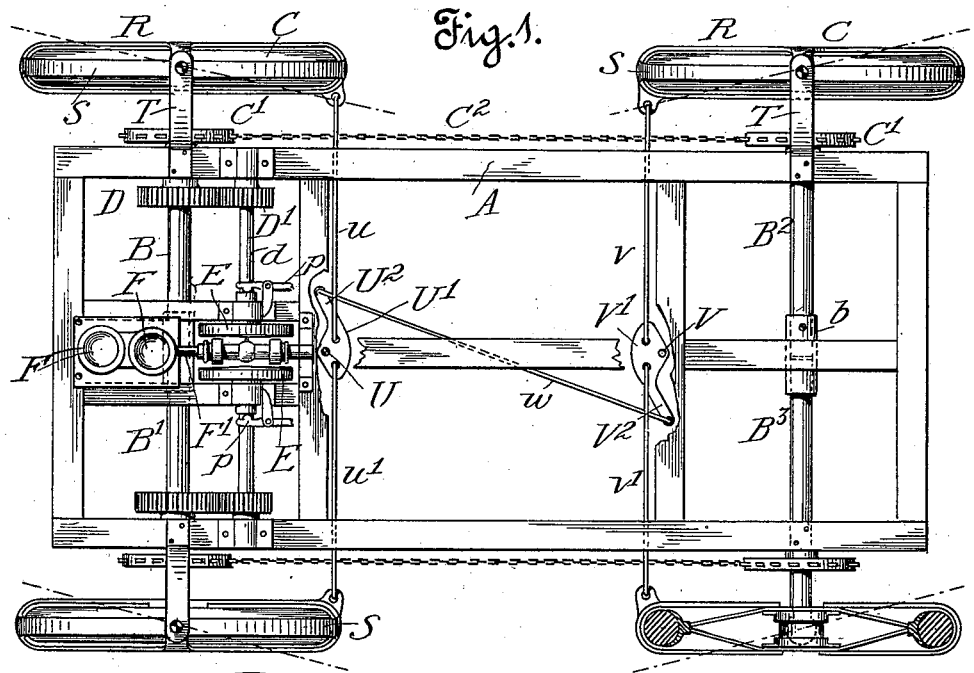
Figure 2:
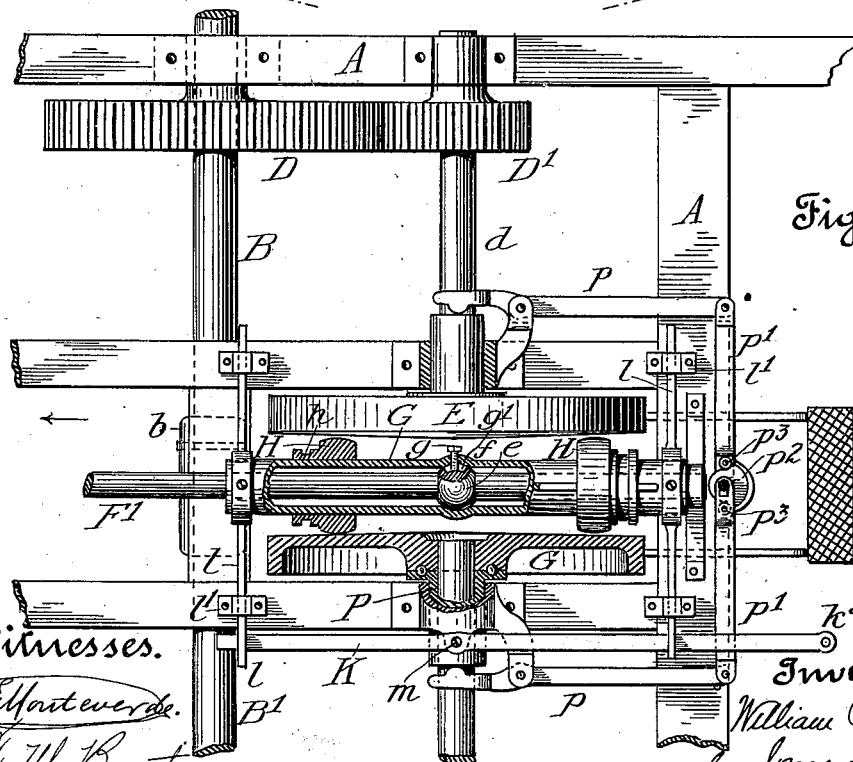

Figure 1 is a plan view. Fig. 2 is an enlarged plan, partly in section, of the driving mechanism of the forward axles. Fig. 3 is a side elevation of the driving-shaft, its sleeve, and one of the main friction-disks. Fig. 4 is a cross-section through the driving-shaft to show in end elevation the relative arrangements of said shaft and its surrounding sleeve. Fig. 5 is a side elevation of one of the wheels. Fig. 6 is a cross-section of the same. Fig. 7 is an elevation of the steering-rod and connections operated by it.

A represents the frame of the vehicle, which is shown as of a generally rectangular form. In the frame are journaled the front axles B B' and the rear axles $B^2$ $B^3$, each having at its end a carrying-wheel C. The members of each pair of axles are connected so as to run rigidly in line, but, if necessary, at different speeds, by a sleeve $b$, secured to one axle and fitting the inner end of the other, Fig. 1. The independent axles on each side are connected front and rear by sprockets C' C' and driving-chains $C^2$. On each part of the front axle is a gear D, by which said axles are geared down from pinions D' on the shafts $d$ $d$, journaled on the frame, one on each side, Fig. 1. The construction is the same on both sides. I have illustrated in the drawings and described herein a frictional mechanism engaging and disengaging at will for driving the axles. The shafts $d$ $d$ carry the friction-disks E, by means of which power is derived from the engine or motor-shaft F'. The engine is conventionally represented at F F, and its shaft extends longitudinally between the friction-disks, as shown in Fig. 2, which also illustrates special features of construction. Between the disks a sleeve G is mounted by a ball-and-socket connection $e$ $f$ upon the engine-shaft, such connection being midway of the sleeve. This construction produces a close-fitting rocking bearing for the sleeve, which for the remainder of its extent has an ample clearance on the shaft, as shown at $f$. Feathered upon the sleeve are two friction-rollers H H, the peripheries of which are in close proximity to the inner faces of the disks E on both sides. As the sleeve G can rock upon its ball-bearing one of these rollers can be caused to bear upon one disk E forward of its center, while the other bears upon the opposite disk back of its center. If the sleeve be then caused to revolve, motion in the same direction and at the same speed will be communicated to the two friction-disks, to their respective shafts, and through the described gearing to the front axles and wheels. If the sleeve be rocked to cause the respective rollers H H to bear upon the opposing friction-disks, respectively, the motion will be reversed. In an intermediate position the rollers clear the disks entirely and no motion is transmitted. The sleeve G is secured to the engine-shaft, so as to turn with it, by a pin or screw $g$, which passes through the sleeve and plays in a longitudinal slot $g'$ in the ball.

The rollers H are adjustable upon the sleeve in order to obtain variable speed by causing them to bear nearer to or farther from the centers of the friction-disk. Each roller has a grooved hub $h$, with which engages a fork $h'$ on a nut $h^2$. These nuts $h^2 h^3$ are movable on the right and left hand threaded rod I, journaled in standards I' on the main frame and having a handle $I^2$. By turning this handle the rollers H H are caused to approach toward or recede from each other to the same extent, and thus to vary the speed of the two driven friction-disks to an equal extent, according as the frictional contacts are nearer to or farther from the centers of said disks.

The reversal of the motion or the disengagement of the frictions has been referred to as accomplished by rocking the sleeve G upon its ball connection with the engine-shaft. At each end of the sleeve and encircling as a working bearing, Fig. 4, is a collar $k$, having opposite pivot-pins $k'$ $k'$. Pivoted upon these pins is a strap $k^2$, with which are formed arms $l$ $l$, which slide in guides $l'$ $l'$. A lever K is pivoted to some convenient part of the structure—as, for instance, to one of the shaft-boxes, Fig. 2, as shown at $m$—and is connected to both arms $l$ $l$ on one or both sides. By any suitable handle or operating device attached at the end $k^3$ of the lever it can be moved horizontally, so as to pull one slide and strap and push the other, producing the rocking motion of the sleeve G, which carries the friction-rollers, but without affecting its rotation.

The working surfaces of the friction-rollers are slightly conical, Fig. 2. This is to insure a proper frictional contact substantially at right angles at any adjustment of the driving-rollers for a certain speed. As the sleeve when driving or reversing is out of longitudinal alinement and the friction-rollers out of transverse alinement the slight conical or bevel shape causes a correct contact to be made between surfaces which are substantially parallel instead of at an acute angle, and, furthermore, the degree of bevel given the surface of the disk bears a correct relation to the extent of adjustment permitted the rollers. Thus at high speed, when the rollers are adjusted near the centers of the disks, a very slight rocking motion of the sleeve at that point must be sufficient to produce the proper amount of frictional contact and pressure, because the longer arc of motion at the end of the sleeve must also produce the same kind of contact near the edge of the disk, and if the disk had a plane surface the arc of movement near the ball-bearing would not be sufficient to carry the roller into contact. The cone-surface, therefore, is graduated so as to equalize all the adjustments from high to low through intermediate speeds, and vice versa, and to give the proper frictional contact and pressure throughout the entire range.

The carrying-wheels C are of peculiar construction and mounting. I prefer to make them of the usual spider pattern with heavy rubber tires. Within the hollow hub of each wheel is a two-part sleeve or socket L L', which is secured to the hub in any suitable way, as by the short screws shown. This is formed as a bearing for a ball M on the end of the half-axle. The parts are secured by a pin or screw $m'$, which passes through the hub and socket and into a slot $n$ in the ball. This makes the wheel tight on the axle so far as the communication of rotary motion is concerned, but allows the wheel to turn horizontally, as on a swivel. The slot-and-pin connection permits the swiveling motion.

N is a covering-plate on the outside and O is a covering-ring on the inner side, both being independent of the hub. The wheel is held in a frame comprising the vertical forks Q on each side, the horizontal forks R of like construction on each side, and the curved connection S, which connects the horizontal forks to the vertical forks. At the top is a pivot $s$, which fits a hole in one end of the arm T, the other end of said arm being secured to the main frame, Fig. 6. The free ends of all the forks are secured to the covering-plate N and ring O on the opposite sides of the wheel-hub. Constructed and mounted in this way each wheel runs rigidly in line, but is capable of being turned on its vertical axes without affecting the driving, the axles continuing to derive motion from the gearing. Now by connecting all the wheels together I provide a steering system by which very sharp curves can be made, the front wheels being pilot-wheels, while the rear wheels are trailers, which are turned in the opposite direction and follow around the curve, so as to reduce the arc in turning to about half the extent of which the front wheels alone are capable.

The steering-rod U is pivoted in the frame and is operated by a handle-bar, wheel, or other suitable means. Fixed on the rod is a plate U', having a projecting arm $U^2$. A similar plate V' is pivoted by a pin or bolt V on the rearward part of the frame between the rear wheels and has an oppositely-projecting arm $V^2$. The rear forks of the front wheels are respectively connected by rods $u$ $u'$ to the plate U' at opposite sides of the steering-rod. The front forks of the rear wheels are similarly connected by rods $v$ $v'$ to the plate V'. The arms $U^2$ $V^2$ are diagonally connected by a rod $w$. By turning the steering-rod in either direction one front wheel will be pushed and the other pulled in the same direction, (dotted lines, Fig. 1,) and by the same motion one rear wheel will be pulled and the other pushed in the opposite direction, but to the same extent as the front wheels, so that they follow around the curve on a shortened radius. Since the carrying-wheels run on independent axles, I am enabled to use a mechanical device operating automatically when the steering-rod is turned to decrease the frictional pressure on the inside forward friction-disk and correspondingly increase the pressure upon the outside disk, giving the proper differential speed to the carrying-wheels during a turn.

By reference to the section at the bottom of Fig. 2 it will be seen that a sleeve or bushing P is mounted within the box of the friction-disk's shaft and has a ball-bearing with the hub of the disk. The construction is the same on both sides. Levers $p\ p$, fulcrumed on the frame, bear against the ends of these bushings. Connecting-rods $p'\ p'$ are pivoted to the ends of these levers, while their inner ends have slots which loosely engage the steering-rod, one above and one below a cam $p^2$, fixed on said rod. (See Fig. 7.) The normal position of the cam is shown in Fig. 2. Each arm has a roller $p^3$ bearing upon the edge of the cam. Supposing the vehicle to be moving in the direction of the arrow in Fig. 2 and it is desired to steer to the left, the high part of cam $p^2$ will act upon the described connections on the right side of the vehicles and will bring increased pressure upon the bushing and friction-disk on that side. This is to compensate for the lessening of pressure on the other disk, caused by the low part of the cam $p^2$ permitting the connections to yield, the pressure on the left-hand bushing to be relieved, and the frictional pressure to wholly or partly cease. Hence the inside forward wheels practically cease to be driven on curves, but without affecting the driving-shafting or the frictional driving-gear for the outside wheels.

For applying brakes the friction-disks afford excellent bearing-surfaces. I have indicated such a brake at X in Fig. 3 operated by foot-power and adapted to bear upon the edges of the friction-disks.

I do not limit myself to exact details of construction and arrangement described herein and shown in the drawings, as I desire to avail myself of such modifications and equivalents as fall properly within the spirit of my invention.

Having thus fully described my invention, what I claim as new, and desire to secure by Letters Patent, is—

1. In a motor-vehicle, front and rear axles, each made in two parts, and each having a carrying-wheel, positive driving-gearing such as sprockets and a chain connecting the front and rear half-axles on both sides, and means for driving said gearing.

2. In a motor-vehicle, front and rear axles, each made in two parts and each having a carrying-wheel capable of limited horizontal motion swiveled upon its end, connections between all of said carrying-wheels, a steering-bar adapted through said connections to cause all of said wheels to turn simultaneously upon their swivel-mountings, positive driving-gearing, such as sprockets and a chain, connecting the front and rear half-axles on both sides, and means for driving said gearing.

3. In a motor-vehicle, carrying-wheels mounted upon suitable axles, a motor and shaft, counter-shafts arranged in line carrying friction-disks and geared to said axles, a rocking sleeve on the engine-shaft, and friction-rollers on said sleeve adapted to engage with said friction-disks respectively at points in advance of and in rear of their centers of rotation.

4. In a motor-vehicle, carrying-wheels mounted upon suitable axles, a motor and shaft, counter-shafts arranged in line carrying friction-disks and geared to said axles, a rocking sleeve on the engine-shaft having a ball-bearing with said shaft, and friction-rollers on said sleeve adapted to engage with said friction-disks respectively at points in advance of and in rear of their centers of rotation.

5. In a motor-vehicle, and in combination with oppositely-placed friction-disks for driving an axle of the vehicle, a motor-shaft, a rocking sleeve on said shaft, and friction-rollers adjustable on said sleeve and adapted to engage the respective friction-disks.

6. In a motor-vehicle, a driving-gear operated from a motor-shaft, and comprising friction-disks and friction-rollers, which latter are driven by the motor-shaft, means for maintaining an equal pressure between said disks and rollers on both sides in the normal line of running, and means for relieving said pressure on one side in turning, whereby the driving on that side wholly or partially ceases.

7. In a motor-vehicle, separately-swiveled carrying-wheels, a system of connections by which they are caused to turn on their swivels simultaneously, a steering-rod for operating said connections, separate frictional gearing for driving the wheels on each side, and connections operated by the steering-rod for relieving the frictional pressure on one side during a turn.

8. In a motor-vehicle, a motor-shaft, two counter-shafts, each carrying a friction-disk adapted to be driven from said motor-shaft, a sleeve on each counter-shaft having an antifrictional bearing with its friction-disk, levers bearing on said sleeves so as to maintain the driving frictional contact, a steering-rod, and a cam on said rod for pressing said levers normally up against the said sleeves, whereby the proper frictional pressure is maintained while the vehicle is in the normal line of motion; but whereby also, on the turning of the steering-rod, the said cam permits the frictional pressure to be relieved on one side, which is the inner side during the turn.

In testimony whereof I have affixed my signature, in presence of two witnesses, this 4th day of April, 1900.

WILLIAM RIDDELL.

Witnesses:
 L. W. SEELY,
 F. M. BURT.